United States Patent [19]

Bell et al.

[11] Patent Number: 4,910,233
[45] Date of Patent: Mar. 20, 1990

[54] PROCESS FOR CROSSLINKING METHYLENE-CONTAINING AROMATIC POLYMERS WITH IONIZING RADIATION

[75] Inventors: Vernon L. Bell, Yorktown; Stephen J. Havens, Newport News, both of Va.

[73] Assignee: The United States of America as represented by the Administrator of the National Aeronautics and Space Administration, Washington, D.C.

[21] Appl. No.: 838,654

[22] Filed: Mar. 11, 1986

[51] Int. Cl.$^4$ ............................ C08F 8/00; C08J 3/28; C08J 3/24

[52] U.S. Cl. .................................... 522/162; 264/22; 522/165; 528/176; 528/308

[58] Field of Search ................. 522/165, 162; 528/176; 264/22

[56] References Cited

U.S. PATENT DOCUMENTS

| | | | |
|---|---|---|---|
| 3,887,522 | 6/1975 | Brzozowski et al. | 522/165 |
| 3,975,249 | 8/1976 | Saniland et al. | 522/162 |
| 4,101,399 | 7/1978 | Costanza et al. | 522/165 |
| 4,256,558 | 3/1981 | Inata et al. | 525/10 |
| 4,269,947 | 5/1981 | Inata et al. | 525/10 |
| 4,433,118 | 2/1984 | Schwartz et al. | 525/437 |

FOREIGN PATENT DOCUMENTS 0056134  4/1980  Japan .................................. 525/165

*Primary Examiner*—Herbert J. Lilling
*Attorney, Agent, or Firm*—George F. Helfrich; John R. Manning; Charles E. B. Glenn

[57] ABSTRACT

The invention relates to a process for crosslinking aromatic polymers containing radiation-sensitive methylene groups ($-CH_2-$) by exposing the polymers to ionizing radiation thereby causing crosslinking of the polymers through the methylene groups. Crosslinked polymers are resistant to most organic solvents such as acetone, alcohols, hydrocarbons, methylene, chloride, chloroform, and other halogenated hydrocarbon, to common fuels and to hydraulic fluids in contrast to readily soluble uncrosslinked polymers. In addition, the degree of crosslinking of the polymers depends upon the percentage of the connecting groups which are methylene which ranges from 5 to 50% and preferably from 25 to 50% of the connecting groups and is also controlled by the level of irradiation which ranges from 25 to 1000 Mrads and preferably from 25 to 250 Mrads. The temperature of the reaction conditions ranges from 25° to 200° C. and preferably at or slightly above the glass transition temperature of the polymer. The crosslinked polymers are generally more resistant to degradation at elevated temperatures such as greater than 150° C., have a reduced tendency to creep under load and show no significant embrittlement of parts fabricated from the polymers.

17 Claims, 1 Drawing Sheet

PROCESS FOR CROSSLINKING METHYLENE-CONTAINING AROMATIC POLYMERS WITH IONIZING RADIATION

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

FIELD OF THE INVENTION

This invention relates to a process for crosslinking methylene-containing aromatic polymers by exposing the polymers to ionizing radiation, thus improving resistance to thermal and solvent exposure.

BACKGROUND OF THE INVENTION

It has been previously shown by R. A. Jewell and G. F. Sykes in Preprints, Division of Organic Coatings and Plastics Chemistry, American Chemical Society, 36(2), 258 (1976); and by V. L. Bell, B. L. Stump, and H. Gager, J. Polym. Sci., Polym. Chem. Ed., 14, 2275 (1976) that methylene groups which connect two phenylene (benzenoid) rings having the structure shown below

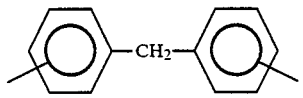

are readily attacked under high temperature oxidative conditions by a reaction mechanism involving radical species. Attack by methylene groups connecting two phenylene rings under high temperature oxidative conditions leads to radical species of the diphenylenemethylene type:

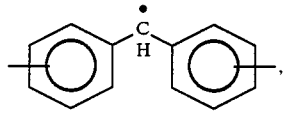

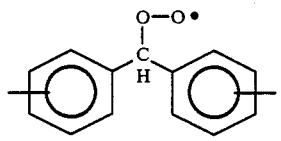

These new radicals on the polymers can react with each other or with other radical species to form stable covalent bonds between adjacent polymer chains, and so crosslinking them.

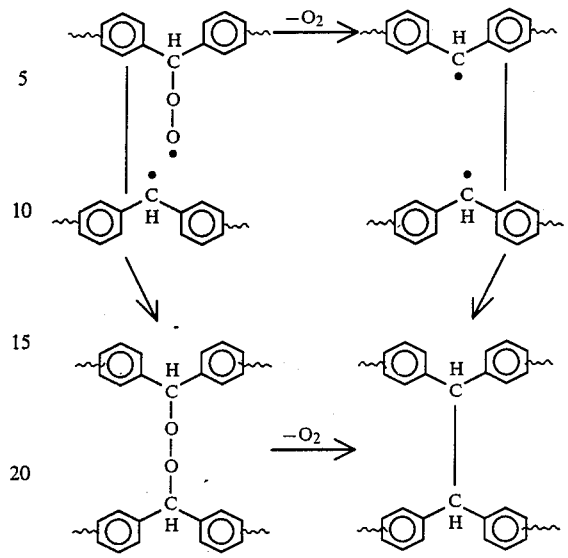

If oxygen is precluded from the thermal environment of the diphenylenemethylene-containing polymers, oxygen-containing radicals cannot be formed, and crosslinking is much less likely. Therefore, the thermooxidative process of Jewell et al involves the reaction of methylene groups with atmospheric oxygen at high temperatures (i.e., greater than 250° C.). The Jewell et al process primarily results in oxidation of the methylene group to the carbonyl group. Some crosslinking occurs but the crosslinking reaction is secondary to the oxidation.

Aromatic polymers containing aliphatic groups other than methylene, such as ethylene (1,2-dimethylene), 1,3-trimethylene, 1,4-tetramethylene, etc., joining the aromatic moieties are quite susceptible to energy-caused cleavage, including irradiation. Therefore, irradiation may lead to degradation of the polymer chains as shown below

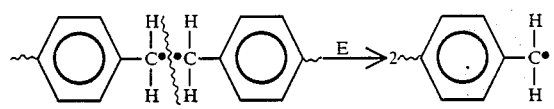

Consequently, a drastic reduction of polymer molecular weight leads to an inevitable loss of desirable polymer properties.

Thus, methylene-containing polymers can be crosslinked by heating the polymers in air to 200° C. or higher. However, that type of crosslinking is accompanied by polymer oxidation. Furthermore, oxygen-promoted crosslinking is limited to very thin films or fibers since oxygen cannot easily penetrate thick polymeric laminates or moldings, and the crosslinking can only take place on the surface of such articles.

Linear condensation polymers with predominantly aromatic structures generally have excellent mechanical properties and thermooxidative stability. However, the aromatic structures responsible for these attractive features also make these polymers difficult to process because of their relatively high softening and melting temperatures. In a study of the effects of aromatic isomerism on polymer properties by V. L. Bell et al, J.

*Polym. Sci., Polym. Chem. Ed.*, 14, 2275 (1976), it was demonstrated that the glass transition temperatures (Tg) of aromatic polyimides could be decreased markedly by the substitution of meta-phenylene groups for para-phenylene groups. The simple substitution of meta,meta' (m,m') oriented aromatic diamines for the customary para,para' (p,p') isomers reduced the Tgs of the polyimides by as much as 100° C., usually with little or no sacrifice in thermooxidative or mechanical properties.

One of the drawbacks to the use of aromatic thermoplastic polyesters as an advanced composite matrix resin is the rather high thermal glass transition temperature (Tg) and polymer melt temperature (Tm) of these materials, as usually encountered with other aromatic homopolymers. Their high softening and melting temperatures are mainly due to the rigid structures resulting from the customary p,p' orientation of the diacid and diphenol monomers used for the synthesis of the aromatic polyester. Consequently, thermal processing and forming into useful articles is difficult.

It was fully expected that the Tgs of aromatic polyesters would be influenced by the same isomer effects as the polyimides. In fact, the 50/50 copolyester of isophthalic and terephthalic acid with bisphenol A (commercially available as ARDEL® D-100 from Union Carbide Corporation) is an engineering thermoplastic (Tg, 194° C.; Tm, 260° C.), described by G. Bier, *Polymer*, 15, 527 (1974), which exhibits good mechanical properties as shown by B. L. Dickinson in *Modern Plastics Encyclopedia* 1984–1985, McGraw Hill, New York, p. 45, 1984. However, ARDEL and most other easily thermoformed polyesters are highly sensitive to solvent induced stress crazing and cracking. ARDEL is soluble in many chlorinated solvents. Efforts were directed toward the twin goals of synthesizing aromatic polyesters with relatively low processing temperatures by the use of m,m'-phenylene linkages and finding a way to crosslink the polyesters after processing. Such a "cure" would not only diminish the thermoplastic nature of the polyesters by reducing creep at high temperatures, but would also moderate their solvent sensitivity.

SUMMARY OF THE INVENTION

This invention relates to a process for crosslinking aromatic polymers containing radiation-sensitive methylene connecting groups (—$CH_2$—) by exposing the polymers to ionizing radiation thereby causing crosslinking of the polymers through the methylene groups. Crosslinked polymers are resistant to most organic solvents including acetone, alcohols, hydrocarbons, methylene chloride, chloroform, and other halogenated hydrocarbons, fuels such as JP-4 jet fuel and hydraulic fluids such as trieresyl phosphates in contrast to readily soluble uncrosslinked polymers. In addition, the degree of crosslinking of the polymers depends upon the percentage of the connecting groups which are methylene which ranges from 5 to 50% and preferably from 25 to 50% of the connecting groups and is also controlled by the level of irradiation which ranges from 25 to 1000 Mrads and preferably from 25 to 250 Mrads. The temperature of the reaction conditions ranges from 25° to 200° C. and preferably at or slightly above the glass transition temperature of the polymer. The crosslinked polymers are generally more resistant to degradation at elevated temperatures such as greater than 150° C., have a reduced tendency to creep under load and show no significant embrittlement of parts fabricated from the polymers.

A critical feature of this invention resides in the unusual response of the methylene (—$CH_2$—) functional groups to ionizing radiation. These methylene groups serve to connect the phenylene groups which constitute the aromatic polymers. Thus, in the process of the present invention, methylene connecting groups are inserted into an aromatic polymer and the polymer is irradiated resulting in a crosslinking of the methylene connecting groups of the polymer. The radiation-induced crosslinking can uniformly penetrate thick polymeric parts and the depth is limited only by the selected particulate energy.

Aromatic polyesters connected by methylene groups were synthesized. Two pairs of aromatic diacid chlorides, 3,3'-methylenedibenzoyl chloride and 4,4'-methylenedibenzoyl chloride were each polymerized via interfacial polycondensation with 2,2-bis-(4-hydroxyphenol)propane (bisphenol A), 3,3'-methylenediphenol, and 4,4'-methylenediphenol. For comparison, 3,3'-carbonyldibenzoyl chloride and 4,4'-carbonyldibenzoyl chloride were similarly polymerized with bisphenol A. Substitution of meta,meta' oriented phenylene groups for para,para' oriented phenylene groups had a significant and cumulative effect in reducing the glass transition temperatures of the polymers, thereby enhancing their processability. In air the methylene groups of the polyesters undergo oxidation and crosslinking at elevated temperatures. Electron beam irradiation of thin films of the methylene linked polyesters at room temperature resulted in some chain extension and crosslinking as evidenced by increased solution viscosity and gel formation. Irradiation at a temperature near or above the glass transition temperatures of the polymers greatly enhanced the tendency for the polymers to crosslink.

The present invention does not require oxygen. In fact, the initial experiments were performed at an extremely high vacuum ($10^{-7}$ torr). The mechanism of the present invention does not, and also cannot involve oxidation of the methylene groups to carbonyl groups. Furthermore, the present invention does not require the use of high temperatures for radical formulation.

BRIEF DESCRIPTION OF THE DRAWINGS

Further details are explained below with the help of the Examples illustrated in the attached drawings in which.

DETAILED DESCRIPTION OF THE INVENTION

Figure 1:
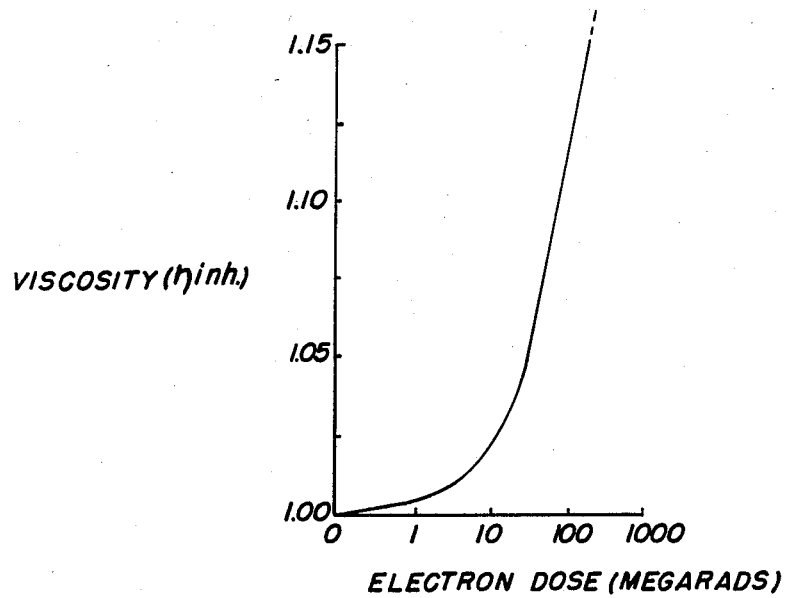
FIG. 1 shows an increase in dilute solution viscosity of Polymer I with an increasing electron dose, which is indicative of crosslinking. Crosslinking was complete at an electron dose of 1000 Megarads.

The diphenylmethylene radical appears to be unique for the method of crosslinking aromatic polymers in the present invention. The high level of stability of the diphenylmethylene radical causes it to be quite specific in its reactivity. Thus, there is little chance that the radical generated from the diphenylenemethylene groups in aromatic polymers will cause scission or cleavage of the polymer chain when exposed to ionizing radiation.

Most "all-aromatic" hydrocarbon polymers having no aliphatic hydrocarbon segments within the main molecular chain of the polymers are relatively inert to ionizing radiation. The insertion of methylene groups into the polymer chain removes that inertness in a favorable manner, permitting crosslinkingg to occur but without concomitant chain scission and its degrading effects. Several examples of polymers described herein comprise aromatic polyesters which have their phenylene, or benzene moieties, connected by ester and methylene groups and preferably by an equal number of these groups. However, other aromatic polymer types can benefit from our invention. Aromatic polysulfones, poly(ethersulfones) and polyethers [particularly poly(2,6-dimethylphenylene oxide)], which comprise aromatic rings interspersed only with ether oxygen, 2,2-isopropylidene, and/or sulfone groups, are quite inert to ionizingg radiation. These polymers incur little crosslinking or chain scission when exposed to moderately high doses, for example, 100 Mrads to 250 Mrads, of ionizing radiation. By inserting the methylene groups critical to the invention into the chemical structures of aromatic poly(ethersulfones) and aromatic polyethers, the resulting polymers can be made inherently responsive to ionizing radiation. The ensuing crosslinked polymers have the same beneficial property changes as the radiation crosslinked aromatic polyesters as set forth in the Examples.

The process of crosslinkingg methylene-containing aromatic polymers with radiation, preferably ionizing radiation, comprises the steps of:

(a) forming an aromatic polymer having methylene connecting groups; and (b) irradiating the polymer, whereby at least some of the methylene connecting groups are crosslinked.

In another embodiment of the present invention, the aromatic polymer contains no aliphatic hydrocarbon segments within the main chain of the polymer except the methylene groups.

It had been observed that films of aromatic polyimides containing a methylene bridge were readily oxidized and crosslinked by exposure to air at high temperatures as shown by Bell, as discussed previously, and R. A. Jewell et al, Prep. Am. Chem. Soc., Div. Org. Coat. Plast. Chem., 36 (2) 258 (1976). This suggested that the benzylic methylene groups were susceptible to radical attack by oxygen, and might be sensitive to radical attack in general. It was previously reported that poly(ethylene 2,6-napthalenedicarboxylate) (PEN) appeared to crosslink in a virtually linear fashion with $\gamma$ radiation dose, V. L. Bell and G. F. Pezdirtz, J. Polym. Sci., Polym. Chem. Ed., 21, 3083 (1983). Degradation by chain scission did not appear to be prevalent. Thus, polyesters containing m,m'-phenylene groups connected with methylene bridges might provide materials which can be easily processed and post cured. The incorporation of flexibilizing methylene groups into the backbones of the polyesters should also aid in reducing their Tgs, although at the possible expense of thermooxidative stability. Initially, the polyester from the reaction of 3,3'-methylenedibenzoyl chloride with bisphenol A (Polymer I, Table I) was synthesized and its film irradiated at various dose levels at room temperature.

TABLE I

Characterization of the Polyesters $$+C(=O)-Ar-C(=O)-O-Ar'-O+_n$$

| | Ar | Ar' | $\eta_{inh}{}^a$ CHCl$_3$ | $\eta_{inh}{}^a$ m-cresol | T$_g$, °C. DSC$^b$ | T$_g$, °C. TBA$^c$ | T$_g$, °C. TMA$^d$ | Film Properties |
|---|---|---|---|---|---|---|---|---|
| I | –⌬–CH$_2$–⌬– | –⌬–C(CH$_3$)$_2$–⌬– | 1.41 | 1.05 | 149 | 149 | 150 | Tough and flexible |
| II | –⌬–CH$_2$–⌬– | –⌬–C(CH$_3$)$_2$–⌬– | — | 1.11 | 212 | 214 | 230 | Tough and flexible |
| III | –⌬–CH$_2$–⌬– 50/50 | –⌬–C(CH$_3$)$_2$–⌬– | 0.72 | 0.70 | 168 | 169 | 170 | Tough and flexible |
| IV | –⌬–C(=O)–⌬– | –⌬–C(CH$_3$)$_2$–⌬– | 0.42 | 0.37 | 165 | 182 | 168 | Brittle |
| V | –⌬–C(=O)–⌬– | –⌬–C(CH$_3$)$_2$–⌬– | 0.79 | 0.93 | 218 | 228 | 222 | Tough and flexible |
| VI | –⌬–CH$_2$–⌬– | –⌬–CH$_2$–⌬– | 0.74 | 0.77 | 101 | 99 | 100 | Tough and flexible |
| VII | –⌬–CH$_2$–⌬– | –⌬–CH$_2$–⌬– | 1.63 | 1.53 | 123 | 123 | 121 | Tough and flexible |

TABLE I-continued

Characterization of the Polyesters $$\begin{matrix} & O & O \\ & \| & \| \\ +C & -Ar-C-O-Ar'-O+_n \end{matrix}$$

| | Ar | Ar' | $\eta_{inh}{}^a$ CHCl$_3$ | $\eta_{inh}{}^a$ m-cresol | T$_g$, °C. DSC$^b$ | T$_g$, °C. TBA$^c$ | T$_g$, °C. TMA$^d$ | Film Properties |
|---|---|---|---|---|---|---|---|---|
| VIII | –⌬–CH$_2$–⌬– | –⌬–CH$_2$–⌬– | 1.56 | 1.48 | 123 | 124 | 123 | Tough and flexible |
| IX | –⌬–CH$_2$–⌬– | –⌬–CH$_2$–⌬– | 1.84 | 1.57 | 185 | 193 | 186 | Tough and flexible |
| X | –⌬–CH$_2$–⌬– | –⌬– | — | 0.56 | 108 | — | — | Very brittle |

$^a$Inherent viscosity, 0.5% solution.
$^b$Differential scanning calorimetry at a heating rate of 20° C. min.
$^c$Torsional braid analysis at a heating rate of 3° C. min.
$^d$Thermal mechanical analysis at a heating rate of 5° C. min.

As dose levels exceeded 100 Mrad, the solution viscosities of the irradiated polymer samples increased, and at a dose of 1000 Mrad the irradiated film became insoluble. The ease with which the polymer samples were crosslinked by treatment with radiation provided encouragement to extend this work to include other polyesters containing methylene linkages. Accordingly, two pairs of aromatic diacid chlorides, 3,3'-methylenedibenzoyl chloride and 4,4'-methylenedibenzoyl chloride were each polymerized via interfacial polycondensation with 2,2-bis(4-hydroxyphenyl)propane (bisphenol A), 3,3'-methylenediphenol, and 4,4'-methylenediphenol. For comparison, 3,3'-carbonyl-dibenzoyl chloride and 4,4'-carbonyldibenzoyl chloride were similarly polymerized with bisphenol A. The study of the effects of aromatic isomerism on the Tgs of the polyesters included a study of the effects of high energy ionizing radiation on these materials.

Aromatic polyesters connected by methylene groups were synthesized in Example 6. Substitution of meta,-meta' oriented phenylene groups for para,para' oriented phenylene groups had a significant and cumulative effect in reducing the Tgs of the polymers, thereby enhancing their processability. In air the methylene groups of the polyesters undergo oxidation and crosslinking at elevated temperatures. Electron beam irradiation of thin films of the methylene linked polyesters at room temperature resulted in some chain extension and crosslinking as evidenced by increased solution viscosity and gel formation. Irradiation at a temperature near or above the Tgs of the polymers greatly enhanced the tendency for the polymers to crosslink.

The following Examples will illustrate several advantages of the invention.

EXAMPLE 1

An aromatic polyester with the following chemical structure was prepared by polymerizing 3,3'-methylenedibenzoyl chloride with 4,4'-isopropylidene diphenol (bisphenol A) by the interfacial polymerization technique.

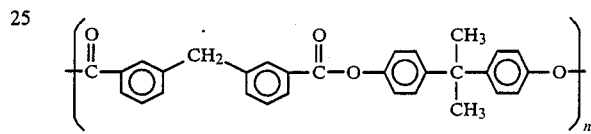

The resulting white polymer was dissolved in chloroform, and the clear solution was cast onto a glass plate. After the solvent had evaporated, a clear film was stripped from the plate and cut into strips about one inch wide. The film strips were then exposed to 70 KeV electrons from an electron flood gun at a dose rate of 15 Megarads (Mr) per hour in a hard vacuum environment ($10^{-7}$ torr) at ambient temperature, at several dose levels ranging from 0 to 1000 Megarads. Viscosities were then measured on solutions of the irradiated samples. FIG. 1 shows an increase in viscosity with an increasing electron dose, which is indicative of crosslinking of the polyester. This experiment indicates that crosslinking progressively increases with an increasing electron dose and manifested as a gradual increase in viscosity at doses up to 100 Mr. Crosslinking becomes so severe above 100 Mr, however, that the polymer films became completely insoluble. Considering that only 25% of the connecting groups were methylene groups, the crosslinking mechanism was considered to be quite effective.

EXAMPLE 2

An aromatic polyester was synthesized by reacting 3,3'-methylenedibenzoyl chloride with 4,4'-methylenediphenol and 50% of the connecting groups were methylene groups. The chemical structure of the polymer was as follows:

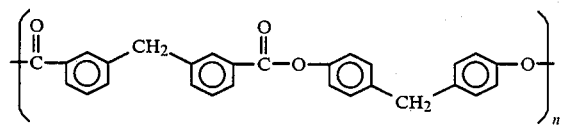

Films from this polyester were irradiated with 70 KeV electrons at a 15 Mr/hr. dose rate. The increase in viscosity of this polymer as measured in m-cresol with increasing radiation dose and the presence of gelled material in the 250 Mr sample was indicative of radiation-induced crosslinking.

EXAMPLE 3

An aromatic polyester which was isomeric to the polymers in Example 2 was synthesized by reacting 4,4'-methylenedibenzoyl chloride with 3,3'-methylenediphenol using the interfacial polymerization technique. As the chemical structure shows below,

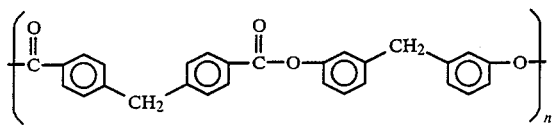

the polymer also had methylene groups constituting 50% of the connecting groups in the aromatic moieties.

Irradiation of films of this polymer under conditions similar to Example 2 resulted in a progressive increase in viscosity over the dose range, culminating in complete insolubility due to crosslinking after a total dose of 250 Megarads.

EXAMPLE 4

Another aromatic polyester, isomeric to those polymers described in Examples 2 and 3, was synthesized by polymerizing 3,3'-methylenedibenzoyl chloride with 3,3'-methylenediphenol, giving the following chemical structure having 50% methylene connecting groups:

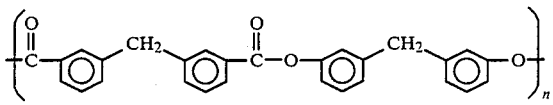

When films of this polyester were irradiated with 70 KeV electrons at ambient temperature (23° C.), the increase in viscosity was relatively minor, increasing from 0.62 to only 0.66 after a 250 Mr dose.

EXAMPLE 5

When films of the polymer used in Example 4 were irradiated to 100 Mr at its glass transition temperature (101° C.), the films became completely insoluble in the m-cresol viscosity solvent, indicating substantial crosslinking had occurred at an economically viable dose. Apparently, irradiation of the polyester at a temperature above its glassy temperature is more effective, due to the mobility of the polymer molecules bearing reactive radicals.

The following Table summarizes the results of Examples 1 to 5.

TABLE 1

| | Inherent Viscosities at Various Doses | | | | | |
| | Total Dose, in Megarads[a] | | | | | |
| Example | 0 | 10 | 25 | 100 | 50 | 1000 |
| --- | --- | --- | --- | --- | --- | --- |
| 1[b] | 1.00 | 1.025 | — | 1.12 | — | Insol. |
| 2[b] | 1.48 | — | 1.48 | 1.67 | 1.96[c] | — |
| 3[b] | 1.54 | — | 1.54 | 1.68 | Insol | — |
| 4[b] | 0.62 | — | 0.62 | 0.63 | 0.66 | — |
| 5[d] | 0.62 | — | — | Insol | — | — |

[a]70 KeV electrons, dose rate of 15 Megarads per hour
[b]Irradiated at ambient temperature (23° C.)
[c]Some gel present in viscosity sample
[d]Irradiated at 100° C.

EXAMPLE 6

Starting Materials 4,4'-Methylenedibenzoic acid, 3,3'-methylenedibenzoic acid, and 4,4'-carbonyldibenzoic acid were obtained from Ash Stevens, Inc., WRD Division of Whittaker Corp., and Carbert Chemical Co., respectively, and recrystallized from glacial acetic acid/N,N-dimethylformamide (DMF) before use. Chromic anhydride oxidation of 3,3'-methylenedibenzoic acid was used to prepare 3,3'-carbonyldibenzoic acid in 33% yield, mp 354°–358° C. (J. Lichtenberger and F. Weiss, Bull. Soc. Chim. France, 587 (1962) 320°–325° C.). 3,3'-Methylenedianiline was obtained from Ash Stevens Inc. Benzyltriethylammonium chloride was purchased from Aldrich Chemical Co. 1,2-Dichloroethane was distilled before use.

Monomers

The diacid chlorides were prepared by reaction of the diacid with an excess of thionyl chloride containing a catalytic amount of DMF: 4,4'-methylenedibenzoyl chloride, mp 109°–110.5° C. (N. K. Moshchinskaya, N. F. Silin, E. E. Dmitrenko, V. A. Liberzon, G. B. Lokshin, and A. M. Korchagina, Neftekimiya, 2, 541 (1962) 109°–110° C.), 3,3'-methylenedibenzoyl chloride, mp 108°–109.5° C. (Moshchinskaya, Ibid. 110°–111° C.), 4,4'-carbonyldibenzoyl chloride, mp 131°–133.5° C. (C. L. Koelsch and C. E. Bryan, J. Am. Chem. Soc., 67, 2041 (1945) 132°–133° C.), 3,3-carbonyldibenzoyl chloride, mp 71.5°–73.5° C. 4,4-Methylenediphenol was purchased from Pfaltz and Bauer, Inc. and recrystallized from water, mp 159°–160.5° C. 3,3-Methylenediphenol was prepared by diazotization of 3,3'-methylenedianiline followed by hydrolysis in boiling sulfuric acid. Distillation at 185°–190° C. (67 Pa) and recrystallization from toluene afforded pale yellow needles, mp 101°–103° C. (H. L. Bender, A. G. Farnham, and J. W. Guyer, U.S. Pat. No. 2,464,207, 1949; Chem. Abstr., 43, 4698 (1949) 102°–103° C.) in 29% yield Resorcinol was recrystallized from water and 2,2-bis(4-hydroxyphenyl)propane (bisphenol A) was recrystallized from toluene.

Polymerization

The polymers were readily prepared by interfacial polycondensation methods utilizing the following general procedure. The diphenol (10 mmol) was dissolved in 50 mL of water containing 20 mmol of sodium hydroxide. The solution was transferred to a blender jar and benzyltriethylammonium chloride (0.10 g) was added. A solution of the diacid chloride (10 mmol) in 50 mL of 1,2-dichloroethane was added rapidly to the slowly stirred diphenol solution. The mixture was then stirred at maximum speed for 5 min. The viscous polymer solution was slowly added to 300 mL of vigorously stirred methanol in a blender to precipitate the polymer. The polymer was collected by filtration and washed repeatedly with water by stirring in a blender and filtering. The polymer was finally washed with methanol and dried at 90° C. overnight. Polymer yields ranged from 95–99%. Characterization data is given in Table I.

Films

Solutions (10–20% w/v) of the various polymers in 1,2-dichloroethane or 1,1,2,2-tetrachloroethane were centrifuged and the supernatant was doctored onto plate glass at a thickness of 0.38–0.51 mm (15–20 mil). After drying to a tack-free state at room temperature, the films were dried overnight under vacuum at a temperature approximately 10° C. above the glass transition temperature of the polymer. Film thickness varied from 0.028–0.064 mm (1.1–2.5 mil).

Irradiation Procedure

Strips of the films were placed in an irradiation chamber, which was degassed at $10^{-7}$ torr for 24 hrs. The films were then exposed at room temperature to ionizing radiation from an electron flood gun at 70 KeV with a dose rate of $1.5 \times 10^7$ rad/hr.

Preparation of Composites

A 10% (w/w) solution of polyester VI dissolved in 1,1,2-trichloroethane was used to impregnate a sheet of fiberglass cloth (112E glass, A1100 finish) stretched in a frame. The cloth was allowed to air dry overnight and was then dried under vacuum at 100° C. for 2 hrs. The prepreg obtained was calculated to have a 50% resin content (w/w). Final thickness was 0.15–0.18 mm (6–7 mil). The prepreg was cut into $10 \times 10$ cm squares.

Synthesis

The polyesters were prepared in good yield by interfacial polycondensation. Molecular weights were reasonably high, as indicated by the viscosities shown in Table I. All polymers except VI and X formed tough, flexible films. In the case of IV the brittleness of the film was apparently due to the relatively low molecular weight achieved in polymer synthesis, possibly due to impurity of the 3,3'-carbonyldibenzoyl chloride. Polyester X formed by reaction of 3,3'-methylenedibenzoyl chloride with resorcinol also formed a brittle film. It was found that films of the polyesters were very susceptible to thermal crosslinking in air. When 1–2 mil thick films were dried for 1 hr. at 200° C. in flowing air, their loss of solubility indicated that crosslinking had occurred. This behavior should have been expected as it has previously been reported that polyimides containing methylene bridging groups were readily oxidized in air at 200°–300° C. by Bell. The thermooxidation of methylene groups to carbonyl groups was found to be accompanied by an indeterminate amount of crosslinking. Carbonyl bridged polyesters IV and V were not thermally crosslinked. The methylene bridged polyesters were dried under vacuum at a temperature approximately 10° C. above their respective Tgs without crosslinking.

Isomer Effects on Glass Transition Temperatures

Glass transition temperatures for the polyesters were determined using three complementary methods: differential scanning calorimetry (DSC), torsional braid analysis (TBA), and thermal mechanical analysis (TMA). Agreement of Tgs for the various polymers determined by the three methods was generally good (Table I) although the Tgs determined by DSC were usually slightly lower than the values determined by TBA and TMA. Differences in heating and cooling rates could easily account for these discrepancies. The Tg value determined by DSC has been used for the comparison of Tgs between polyesters.

As expected, the substitution of a meta,meta' oriented diacid chloride for a para,para' oriented diacid chloride had a significant effect in reducing the Tg of the polyester. When 3,3'-methylenedibenzoyl chloride was substituted for 4,4'-methylenedibenzoyl chloride in the polycondensation with bisphenol A, the resulting polymers I (Tg=149° C.) and II (Tg=212° C.), had a ΔTg of 63° C. The Tg of III, the 50/50 copolymer of 3,3'-methylenedibenzoyl chloride and 4,4'-methylenedibenzoyl chloride with bisphenol A, was 168° C. This Tg was between those of polymers I and II, but III appeared to melt at a lower temperature than either of the homopolymers. Similarly, the substitution of 3,3'-carbonyldibenzoyl chloride for 4,4'-carbonyldibenzoyl chloride in polymerization with bisphenol A resulted in polymers IV (Tg=165° C.) and V (Tg=218° C.) with ΔTg 53° C. Polyesters VI and VIII, obtained from reaction of 3,3'-methylenedibenzoyl chloride and 4,4'-methylenedibenzoyl chloride with 3,3'-methylenediphenol, have Tgs of 101° C. and 123° C., respectively, for a ΔTg of 22° C. Reaction of the same diacid chlorides with 4,4'-methylenediphenol produced polyesters VII (Tg=123° C.) and IX (Tg=185° C.) for a ΔTg=62° C. Comparison of polyesters containing the same diacid segment (Ar) but different diphenol segments (Ar') gives simlar results. Compare polyesters VI and VII (ΔTg=62° C.). Interestingly, polymers VI and VIII in which the Ar and Ar' segments are reversed have the same Tg. While the substitution of m,m' oriented isomers for p,p' oriented isomers has a significant and cumulative effect in reducing the Tg of the polyesters, it appears to make little difference whether substitution takes place with the diacid segment or with the diphenol segment.

Thermooxidative Stability

Figure 2:
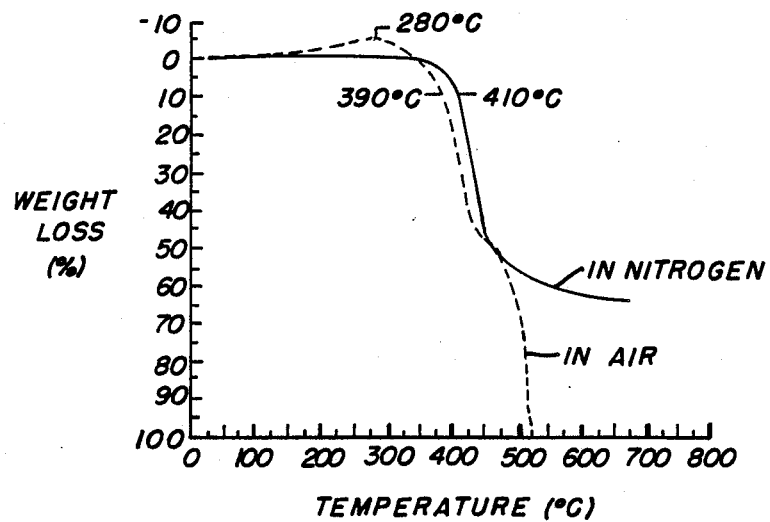
FIG. 2 shows thermogravimetric analysis curves of polyester VI in nitrogen and flowing air at a heating rate of 2.5° C. per minute.

Thermogravimetric analysis curves of polyester VI were obtained in both nitrogen and flowing air (FIG. 2). In a nitrogen atmosphere VI exhibited a 1–2% weight loss beginning at ca. 340° C. followed by more drastic decomposition (10% weight loss) at 410° C. In air VI gradually began to gain weight, starting at ca. 150° C. and reaching a maximum weight gain of 4.3% at 280° C. If both methylene groups in the repeat unit of VI were quantitatively oxidized to carbonyl groups, a weight gain of 6.65% would have been expected. A weight loss of 10% occurred at 390° C.

Unfortunately, the temperature range at which oxidation/crosslinking occurred encompassed the processing temperature range for this polymer. The processing of thin sections of these methylene-bridged polyesters would have to be done in an oxygen-free environment.

Effects of Ionizing Radiation

Thin films (1.1–2.5 mils) of the polyesters were subjected to ionizing radiation at dose levels of 25, 100, and 250 Mrad at room temperature. After irradiation samples were examined for evidence of crosslinking by solution viscosity (Table II).

TABLE II

Effect of Ionizing Radiation on Aromatic Polyesters Containing Various Linkages

| | Ar | Ar' | $\eta_{Inh}$ dose, Mrad | | | | Solvent |
|---|---|---|---|---|---|---|---|
| | | | 0 | 25 | 100 | 250 | |
| I | –⟨◯⟩–CH$_2$–⟨◯⟩– | –⟨◯⟩–C(CH$_3$)$_2$–⟨◯⟩– | 0.90 | 0.84 | 0.87 | 1.00 | CHCl$_3$ |
| II | –⟨◯⟩–CH$_2$–⟨◯⟩– | –⟨◯⟩–C(CH$_3$)$_2$–⟨◯⟩– | 1.14 | 1.15 | 1.10$^a$ | 1.24$^a$ | m-cresol |
| III | –⟨◯⟩–CH$_2$–⟨◯⟩– 50/50 | –⟨◯⟩–C(CH$_3$)$_2$–⟨◯⟩– | 0.69 | 0.69 | 0.70 | 0.70 | CHCl$_3$ |
| IV | –⟨◯⟩–C(=O)–⟨◯⟩– | –⟨◯⟩–C(CH$_3$)$_2$–⟨◯⟩– | 0.37 | 0.35 | 0.34 | 0.37 | m-cresol |
| V | –⟨◯⟩–C(=O)–⟨◯⟩– | –⟨◯⟩–C(CH$_3$)$_2$–⟨◯⟩– | 0.88 | 0.91 | 0.89 | 0.89 | CHCl$_3$ |
| VI | –⟨◯⟩–CH$_2$–⟨◯⟩– | –⟨◯⟩–CH$_2$–⟨◯⟩– | 0.62 | 0.62 | 0.63 | 0.66 | CHCl$_3$ |
| VII | –⟨◯⟩–CH$_2$–⟨◯⟩– | –⟨◯⟩–CH$_2$–⟨◯⟩– | 1.48 | 1.48 | 1.67 | 1.96$^a$ | m-cresol |
| VIII | –⟨◯⟩–CH$_2$–⟨◯⟩– | –⟨◯⟩–CH$_2$–⟨◯⟩– | 1.54 | 1.54 | 1.68 | —$^b$ | CHCl$_3$ |
| IX | –⟨◯⟩–CH$_2$–⟨◯⟩– | –⟨◯⟩–CH$_2$–⟨◯⟩– | —$^b$ | —$^b$ | —$^b$ | —$^b$ | m-cresol |

$^a$Some gelled material.
$^b$Insoluble in either chloroform or m-cresol.

Chain extension was evident as an increase in solution viscosity from that of the unirradiated film sample, while crosslinking was observed as gel formation or polymer insolubility. In no case was the crosslink density required to cause network formation and insolubility high enough to alter the short-range thermal characteristics of the polyesters (i.e., increase the Tg).

The control materials (IV and V), which contained carbonyl linkages instead of methylene linkages, did not show increased viscosity at a maximum dose of 250 Mrad, nor was there any evidence of gel formation. Methylene bridged polyesters I and II exhibited slight viscosity increases with increased radiation dose, including some gel formation in the case of II. However, the 50/50 copolymer, III, showed no increase in viscosity to 250 Mrad. The behavior was unexpected and without satisfactory explanation, although a morphological state in which methylene groups of adjacent polymer chains are misaligned is a possibility. It was expected that polyesters containing two methylene linkages per repeat unit would be more susceptible to radiation induced crosslinking. This was the case with polymers VII and VIII. Polymers VI showed only a slight increase in viscosity after irradiation at 250 Mrad. Again, the explanation may be related to morphology. Polymers VII and VIII, which have only the orientation of their di-acid and diphenol segments reversed, exhibited similar solution behavior after irradiation. The unirradiated film of polymer IX was insoluble in both chloroform and m-cresol whereas IX precipitated from its reaction mixture was soluble in both solvents. It appeared that polyester IX crystallized as the film was slowly cooled to room temperature after drying under vacuum at 195° C. DSC analysis of the film showed a small melting endotherm at 275° C. The sample was quenched and rerun to give a DSC curve showing no melting endotherm. Although the extent of crosslinking for this polymer could not be determined, crystallization of the films would have made crosslinking more difficult at room temperature. For all the polyesters, crosslinking at temperatures so far below their Tgs were probably dependent upon the proximity of methylene groups of adjacent polymer chains.

Due to apparent effect of polymer morphology on the extent of radiation induced crosslinking, it was evident that the polyester films would have to be maintained at temperatures near or above their Tgs when irradiated. The experimental difficulties associated with this approach precluded irradiation of all the polymer films above their Tgs. The polyester with the lowest Tg (VI, Tg=101° C.) was irradiated at 100 Mrad at 100° C. The irradiated film was insoluble in chloroform and showed ohnly slight swelling, indicating extensive crosslinking. Not only are the polymer chains mobile at the Tg but the activation energy required for the formation of diphenylmethyl free radicals is substantially reduced. Both factors could logically account for the enhanced tendency for the polymer to crosslink above its Tg.

Processability

Thin fiberglass cloth reinforced composite specimens using polyester VI as the matrix resin were prepared in order to evaluate processability. At 260° C. and 63 psi the resin appeared to flow well. Adhesion between plies was good. The matrix resin was completely dissolved when a small composite specimen was immersed in chloroform. It is expected that the irradiation of the thick composite specimens at elevated temperatures with suitable penetrating energy will improve the chemical resistance of the composites in a manner similar to that noted for the thin films.

We claim:

1. A process for crosslinking methylene containing aromatic polymers with ionizing radiation, which comprises:
    forming an aromatic polymer having methylene connecting groups; and
    crosslinking the methylene connecting groups of the polymer by irradiation.

2. A process for crosslinking methylene containing aromatic polymers with ionizing radiation, comprising:
    providing an aromatic polymer containing methylene connecting groups; and
    crosslinking the methylene connecting groups of the aromatic polymer by irradiation.

3. The process according to claim 2, wherein the aromatic polymer contains no aliphatic hydrocarbon segments within the main chain of the polymer except the methylene groups.

4. The process according to claim 2, wherein the aromatic polymers are selected from the group consisting of aromatic polyesters, aromatic polysulfones, poly(ether sulfones) and polyethers.

5. The process according to claim 1, wherein the aromatic polyesters have benzene moieties connected by a number of ester and methylene groups.

6. The process according to claim 1, wherein the methylene connecting groups and other connecting groups are present in equal numbers.

7. The process according to claim 1, wherein the aromatic polymer is poly(2,6-dimethylphenylene oxide).

8. The process according to claim 4, wherein the aromatic polysulfones, poly(ether sulfones) and polyethers have aromatic rings interspersed only with methylene, ether oxygen, 2,2-isopropylidene and sulfone groups.

9. The process according to claim 4, wherein the aromatic polysulfones, poly(ether sulfones) and polyethers have aromatic rings interspersed only with methylene and ether oxygen, 2,2-isopropylidene or sulfone groups.

10. The process according to claim 2, comprising:
    preparing the aromatic polyester by polymerizing 3,3'-methylenedibenzoyl chloride with 4,4'-isopropylidene diphenol using an interfacial polymerization technique;
    dissolving the polyester in a solvent to form a polyester solution;
    casting the solution onto a support;
    evaporating the solvent; and
    exposing the polyester to an electron dose.

11. The process according to claim 2, wherein the polymer is irradiated with about 70 KeV electrons at about a 15 Mr/hr dose rate.

12. The process according to claim 2, wherein the aromatic polyester has about 50% of the connecting groups being methylene groups and is synthesized by reacting 3,3'-methylenedibenzoyl chloride with 4,4'-methylenediphenol.

13. The process according to claim 2, wherein the aromatic polyester has about 50% of the connecting groups being methylene groups and is synthesized by reacting 4,4'-methylenedibenzoyl chloride with 3,3'-methylenediphenol.

14. The process according to claim 2, wherein the aromatic polyester has about 50% of the connecting groups being methylene groups and is synthesized by reacting 3,3'-methylenedibenzoyl chloride with 3,3'-methylenediphenol.

15. The process according to claim 2, wherein irradiation of the aromatic polymer is at or above the glass transition point of the polymer.

16. The process according to claim 2, wherein the irradiating dose is about 250 Mr.

17. The process according to claim 2, wherein no oxygen is present.

* * * * *